US007236555B2

United States Patent
Brewer (10) Patent No.: US 7,236,555 B2
(45) Date of Patent: Jun. 26, 2007

(54) METHOD AND APPARATUS FOR MEASURING JITTER

(75) Inventor: Symon Brewer, Los Gatos, CA (US)

(73) Assignee: Sunrise Telecom Incorporated, San Jose, CA (US)

(*) Notice: Subject to any disclaimer, the term of this patent is extended or adjusted under 35 U.S.C. 154(b) by 0 days.

(21) Appl. No.: 10/826,198

(22) Filed: Apr. 15, 2004

(65) Prior Publication Data

US 2005/0163204 A1 Jul. 28, 2005

Related U.S. Application Data (60) Provisional application No. 60/538,945, filed on Jan. 23, 2004.

(51) Int. Cl.
G11B 20/20 (2006.01)
G08C 25/00 (2006.01)
H04L 7/02 (2006.01)
H04L 7/00 (2006.01)

(52) U.S. Cl. .............. 375/357; 375/360; 375/371; 327/141; 714/700; 714/746; 714/798

(58) Field of Classification Search ........... 375/224, 375/354, 355, 362, 371, 373–376, 226; 324/76.77; 702/190, 69; 327/147, 156, 161–163, 182–183; 370/350, 503, 516–519
See application file for complete search history.

(56) References Cited

U.S. PATENT DOCUMENTS 5,400,370 A * 3/1995 Guo ........................ 375/371
5,663,991 A * 9/1997 Kelkar et al. ............ 375/376
6,528,982 B1 * 3/2003 Yanagisawa et al. ..... 324/76.77
6,598,004 B1 * 7/2003 Ishida et al. ............... 702/69
6,782,353 B2 * 8/2004 Suzuki ..................... 702/190
6,795,496 B1 * 9/2004 Soma et al. ............... 375/226
7,120,215 B2 10/2006 Li et al.
2004/0146097 A1 * 7/2004 Jungerman et al. ....... 375/226
2005/0069031 A1 * 3/2005 Sunter et al. ............. 375/224

FOREIGN PATENT DOCUMENTS

WO      WO 99/57842      11/1999

OTHER PUBLICATIONS

"FPGA and CPLD Architectures: A Tutorial", Summer 1996, IEEE Design and Test of Computers, vol. 13, No. 2, p. 43, 51-53.*

* cited by examiner

Primary Examiner—Kevin Kim
Assistant Examiner—Linda Wong
(74) Attorney, Agent, or Firm—Mikio Ishimaru; William D. Zahrt, II (57) ABSTRACT

In a method for measuring jitter, a signal under test is inputted to generate signal transition locations. A signal transition location is latched using a sampling clock signal, and the signal transition location is converted to a delay value. The delay value is converted to an edge position output, and a value of the edge position output is detected.

20 Claims, 3 Drawing Sheets

METHOD AND APPARATUS FOR MEASURING JITTER

CROSS-REFERENCE TO RELATED APPLICATION

This application claims the benefit of U.S. Provisional Patent Application Ser. No. 60/538,945 filed Jan. 23, 2004, and the subject matter thereof is hereby incorporated herein by reference thereto.

TECHNICAL FIELD

The present invention relates generally to data transmission, and more particularly to a method and apparatus for measuring jitter in data signals.

BACKGROUND ART

In modern digital transmission systems, a data signal is converted into a series of 0's and 1's called "bits". In an ideal system, all the data signal bits that are sent down a transmission channel or transmission line have exactly the same length and spacing. This is important at the receiver end of the transmission channel so that the stream of 1's and 0's can be converted back into the original data signal.

Unfortunately, numerous factors in the transmission channel can alter or interfere with the desired precise timing of the data signal bits that are sent or transmitted. This applies to virtually all types of data communication, including telephone lines, computer networks, optical fibers, radio communication, and so forth. The resulting random variations in the timing of the signal are called "jitter".

"Jitter measurement" refers to analyzing the variations in the timing of the bits and determining the nature and the amount of the timing uncertainty—or jitter—that has been put onto the data bits by the time that the data signals get to the receiving end of the transmission line. The measurements reveal both the amplitude of the jitter and the frequency of the jitter.

The amplitude of the jitter is the amount or size of the timing error in each of the bits. That is, jitter amplitude is the difference between the time that the bit should have arrived and the time that the bit actually does arrive.

The frequency of the jitter is a measurement that tells how quickly or how slowly the amount of jitter is changing. Thus, for example, the frequency of the jitter is a measurement of how quickly the bits switch back-and-forth from being early at one moment, then late at another, then early again, and so forth. Jitter frequency is thus the frequency of the variations in the timing of the data bits.

The jitter frequency, of course, is different from the frequency of the actual data bits in the transmission channel. The jitter frequency is normally from about 10 Hz up to around several percent of the data bit frequency rate in the transmission channel. The required bandwidth for jitter measurement, therefore, can be very large. For example, one specification for measuring jitter in a 155 Mb per second signal would require the ability to measure jitter up to 1.3 MHz.

As indicated, there are many sources of jitter. One source is "data-related" jitter. With data-related jitter, the jitter is associated with the non-repetitive nature of the string of 1's and 0's in a data signal. For example, if a long string of 0's is followed by a long string of 1's, or vice versa, the result can be a slight, instantaneous transition point in the data signal timing. This can be caused by many factors, such as power supply noise on the transmitter, crosstalk from other signals, relays, reflections in the transmission line, and so forth.

Other forms of jitter can appear within a multiplexed signal. One of these comes from combining separate source data signals into a single multiplexed signal. For example, in a 155 Mb/s multiplexed signal there might be 63 T1 signals, each at a frequency of 1.5 MHz. (The term "T1" generally refers to a high-speed data circuit line rate format that carries 24 user channels at a combined speed of 1.5 MHz.) The timings of these different signal bits from the various different T1 signals may not be equally spaced within the multiplexed 155 Mb/s channel. The different timing spacings then appear as jitter at the receiving end of the data channel.

There is a relationship between the jitter frequency and the difficulty of compensating for the jitter. Generally, the higher the jitter frequency, the smaller the jitter amplitude that can be managed. It is thus important to be able to measure both the amplitude of the jitter and the frequency (or frequency band) of the jitter. It would be particularly useful to be able to measure the spectrum of the jitter as well.

Traditional jitter measurement has been performed with analog circuitry. Such analog circuitry, unfortunately, has numerous shortcomings. For example, it is susceptible to signal noise, temperature variations, power supply noise, calibration problems, and so forth.

Analog circuits also become more challenging with increasing network and data system bit rate speeds. It is very difficult to get analog circuitry to function satisfactorily at high speeds and frequencies.

High frequency analog analysis circuitry is also difficult to miniaturize for portable use in analyzing data transmission lines in the field. It is also difficult to keep such portable analog circuitry calibrated and stable during the jostling and the temperature variations that occur as it is moved from place to place in the field.

Still another limitation with analog equipment is power consumption, particularly since oscillator power consumption increases as frequencies increase. Similarly, the need for shielding increases as frequencies increase.

All this results, typically, in a larger piece of equipment that might be acceptable in a laboratory environment but not in mobile testing equipment, and particularly not in hand-held equipment intended for field use.

In addition to such limitations as increased power consumption, increased shielding, increased instability, and increased size, there are additional technical problems from increasing the speed of analog circuitry. These contribute as well to accuracy problems. For example, every tiny resistor and capacitor in an analog circuit has a manufacturing tolerance (typically from 1% to 10%). All these tolerances have to be taken into account when the circuit is designed, and sufficient calibration capacity must be incorporated to compensate for all the tolerance variations. Further, such devices have values that drift over time as well as with temperature. Thus, factory recalibration can sometimes be necessary as often as every six months.

Thus, a need still remains for improved jitter measurement methods and apparatus. In view of the continuing increase in data rates, transmission frequencies, and component miniaturization, it is increasingly critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method for measuring jitter. A signal under test is inputted to generate signal transition locations. A signal transition location is latched using a sampling clock signal, and the signal transition location is converted to a delay value. The delay value is converted to an edge position output, and a value of the edge position output is detected. This results in a method that provides improved jitter measurement in data transmission signals.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

In the following description, numerous specific details are given to provide a thorough understanding of the invention. However, it will be apparent that the invention may be practiced without these specific details. In order to avoid obscuring the present invention, some well-known circuits and system configurations are not disclosed in detail. The same numbers are used in all the drawing FIGS. to relate to the same elements.

The present invention, directed to measuring jitter in data signals, includes a sampled delay line consisting of cascaded delay elements. In one embodiment, these delay elements are digital electrical buffers, and it will be understood that other appropriate devices that delay signals can also be used.

The delay line is tapped along its length, between selected delay elements, so that the state of the line at each of the taps can be sampled. The sampling is controlled by a sampling clock that samples at a rate sufficiently fast to ensure that a signal state change does not pass from one end of the delay line to the other without being sampled at some point along the delay line.

For a digital signal, the line state is represented by either a 0 or a 1. In that case, the sampling can be performed by flip-flop circuits along the delay line that are clocked by the sampling clock. For example, if the signal changes state from 0 to 1, then the elements in the delay line will also change sequentially from 0 to 1 as the signal propagates through the delay line.

In the embodiment shown and described, the elements change in order from the first to the last. If the delay line is sampled while the elements are changing, the earlier elements will have changed, while the later elements will not have changed. The number of elements that have changed is a measure of the timing of the state change. The samples can then be processed to determine which element the state change has reached at the time of the sampling clock. This is the "transition" element position, i.e., the point where the delay line samples have changed from one state to another. Since the delay of each delay element is known, the timing properties of the digital signal can be obtained.

If, for example, the sampling clock is sampling at the signaling rate, then variations in the transition point correlate with, and thus characterize, jitter on the data signal under test. Furthermore, since jitter is usually defined as variations that have a frequency above about 10 Hz, signal processing can be used, as taught herein, to remove the artifacts that are associated with a sampling clock that is different from the signaling rate. One such artifact that is caused by the different signaling rate can be perceived as a "ramp" in the location of the transition position. The gradient of the ramp then represents the difference in frequency of the signaling and the sampling clock.

Of course, data bit errors can also change at frequencies below 10 Hz, but due to the different needs for analyzing bit rate errors at these lower frequencies, that phenomenon is referred to as "wander" rather than jitter. For example, wander needs a much more accurate reference signal to be satisfactorily measured.

Sometimes, where jitter measurement is required in a system, there may not be a transition for every data bit that is sent. For example, in non-return-to-zero ("NRZ") systems, consecutive bits of the same value (0 or 1) do not have a transition between them. In this case, the present invention remembers the last transition point until a new transition occurs.

If the timing variation between two consecutive samples becomes too large, an over-range function detects this condition. In that case, an indication is given that the incoming jitter is such that it is impractical to try to determine, without further information, which transition is from which data bit position. This is more likely to occur when jitter amplitudes are large.

The amplitude of the jitter is the amount that the signal timing at the receiving end of the data transmission channel is varying. Jitter amplitude is normally measured as a percentage of a unit interval ("UI"), which is the length of one bit or data signal element. Thus, a jitter amplitude of 0.45 UI's would indicate that the timing at the receiving end of the data transmission channel is varying by approximately half a bit. In some cases, for example when multiplexing data bit signals into higher combined bit rates, amplitudes can range to 10's or 100's of UI's.

The frequency of the jitter is a measurement of how quickly or how slowly the amount of jitter is changing. There is a relationship between the jitter frequency and the difficulty of compensating for the jitter. Generally, the higher the jitter frequency, the smaller the number of UI's that can be managed. This decrease in the ability to manage large jitter amplitudes is reflected in industry specifications for jitter recovery circuits, which typically include a roll-off in UI capability with increasing frequency.

For example, when the jitter frequency is low, then the edge of the data bits will move just slightly from one bit to the next, so the circuitry can cope with it by just tracking it. Thus, even a large amplitude of several hundred UI's can be compensated and the data recovered. Conversely, at a higher frequency and the same amplitude, the bit edges might move, for example, half a UI from one bit to the next, which would result in data loss because it could not be determined whether a particular bit belonged to one time slot or an adjacent time slot.

Traditional jitter measurement has been performed with analog circuitry. The analog circuitry includes a phase-lock loop that consists of an oscillator, a filter, and a phase comparator. This sets up a reference clock that is at the same frequency or a multiple of the frequency of the incoming data signal. Then, if the incoming data signal varies in timing, the reference signal generated by the phase-lock loop allows determination of the amount the incoming data signal timing has changed. The jitter measurement is then derived from this measured timing signal variation.

Such analog circuitry, unfortunately, has numerous shortcomings. For example, it is susceptible to signal noise, temperature variations, power supply noise, calibration problems, and so forth. Analog circuits also become ever increasingly difficult to design, fabricate, and maintain as their frequencies increase. Such increases in frequency are an everyday requirement in networks and data systems, because the data bit rates are continually increasing with the continuing improvements in communications technologies. In a fiber transmission link, for example, data rates of 40 Gbps are common, meaning that each data bit has a length of approximately 25 picoseconds. It is very challenging to get analog circuitry to function satisfactorily at such speeds.

Advantageously, it has been discovered that the invention, as taught and disclosed herein, can be implemented in modern digital integrated circuits, including field-programmable gate arrays ("FPGAs"). Some FPGAs contain a "carry chain" circuit structure. The carry chain is primarily intended for digital arithmetic circuits, but as disclosed and taught herein, the carry chain can be used as a delay line with taps of the order of 100 ps. Such an implementation is much smaller and much less expensive than conventional jitter measurement using analog circuitry.

It has also been discovered that the resolution of some jitter measurements can actually be increased by the addition of timing noise to the signal under test. Because jitter measurement is usually carried out over a certain band of interest, typically from about 10 Hz to about 1% or so of the signaling rate, timing noise introduced over a very wide band can increase resolution beyond the delay tap resolution. To accomplish this, the invention adds wideband noise to the data signal and then filters out noise above the band of interest, resulting in an increase in resolution.

Noise can be added in several ways. For example, it can be added by using a delay device, by varying the threshold of sampling pins, by adding power supply noise to the delay line power supply, and so forth. All of these noise addition methods can be used, for example, in an FPGA implementation.

In one FPGA implementation according to the present invention, filtering has been accomplished by using digital signal processing ("DSP") that is implemented in the FPGA alongside the delay line. Such DSP filtering readily provides measurements that meet ITU-T specifications O.171/O/172 for Jitter Measuring Equipment.

To give an accurate measurement, the delay line timing characteristics should be known. The timing of the delay line elements can be calibrated, or the timing can be known by design. In one FPGA implementation, the delay line was calibrated by generating two signals with known frequencies and a known frequency difference. The calibration signals were generated using a phase-locked loop. One of the calibration signals was used as the sampling clock; the other was fed into the jitter measuring circuit as a test signal. Because of the known frequency difference, the output from the delay line sampler was a ramp of known gradient. Because of the known frequency, the outputs of the sampler were correlated with the time that passed. The delay line elements were then each calibrated by storing in a calibration memory the time at which each sample transition occurred.

Figure 1:
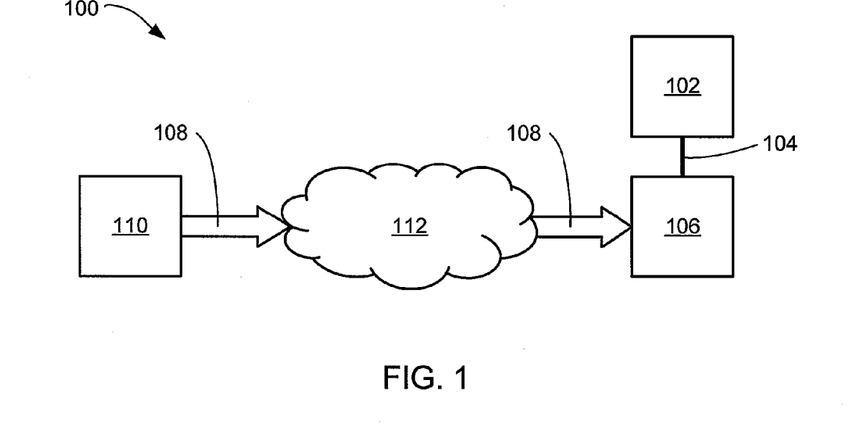
FIG. 1 is an overview of a network in which a jitter measuring circuit is utilized.

Referring now to FIG. 1, therein is shown a network overview 100 in which a jitter measuring circuit 102 is utilized. In particular, the jitter measuring circuit 102 measures the jitter on a signal 104 received by a receiver 106 from a transmission channel 108. The signal 104 originated in a transmitter 110 that inserted the signal 104 into the transmission channel 108 for reception by the receiver 106. A network 112, such as the Internet, may be present as part of the transmission channel 108.

Figure 2:
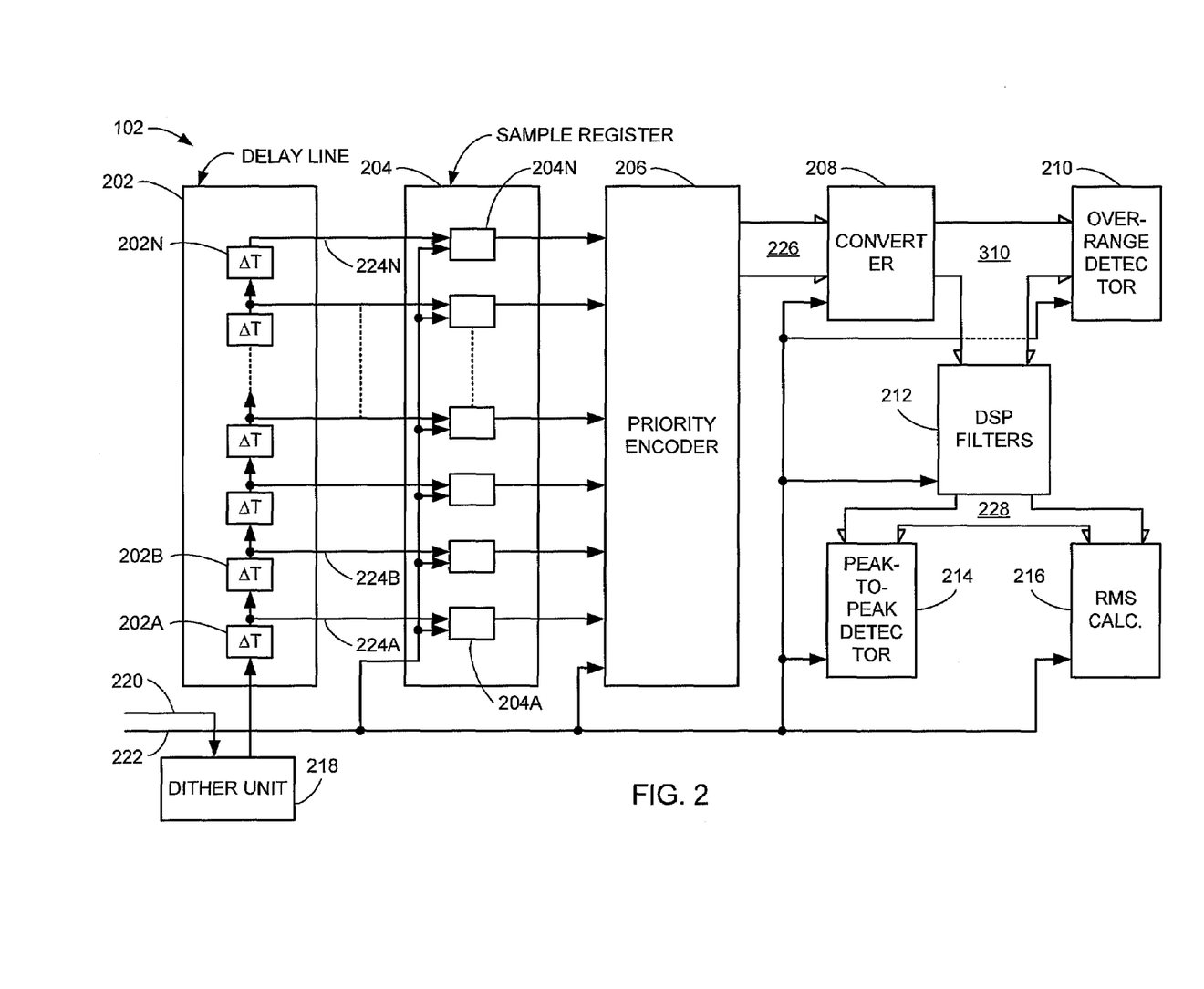
FIG. 2 is a block circuit diagram of the jitter measuring circuit of FIG. 1 according to the present invention.

Referring now to FIG. 2, therein is shown a block circuit diagram of the jitter measuring circuit 102 according to the present invention. The jitter measuring circuit 102 includes a block 202 that is a tapped delay line, a block 204 that is a sample register, a block 206 that is a priority encoder, a block 208 that is a converter for converting the clock and delay to time values, a block 210 that is an over-range detector, a block 212 that is DSP filters, a block 214 that is a peak-to-peak detector, a block 216 that performs root mean square ("RMS") measurement calculations, and a block 218 that is a dither unit.

Referring now to the block 202, the tapped delay line consists of cascaded delay elements 202A, 202B, . . . 202N. Each of the delay elements 202x provides a small amount of signal time delay ΔT. As can be seen in FIG. 2, the delay elements 202x are connected sequentially, and thus the ΔT time delays in each delay element accumulate as a data signal moves through the block 202 tapped delay line. Accordingly, if there are n ΔT time delay elements, then n times ΔT is the total time delay from the beginning (at the delay element 202A) to the end (at the delay element 202N) of the block 202 tapped delay line.

A data signal under test 220, which may be the signal 104 (FIG. 1), is supplied first to the block 218 dither unit and from there to the delay element 202A at the beginning of the block 202 tapped delay line. Then, as previously described, after each incremental time delay ΔT, the data signal under test 220 proceeds sequentially to the subsequent delay elements 202B . . . 202N. Accordingly, inputting the data signal under test 220 into the block 202 tapped delay line will generate data signal transition locations in the block 202 tapped delay line as the data signal propagates therethrough.

As previously stated, the several ΔT time delay intervals can each be different intervals. As described above and in further detail below, the jitter measuring circuit 102 includes circuitry that calibrates and accounts for the variations, if any, in the several ΔT time delays. By this means, the accuracy of the present invention is increased while the cost can be reduced by accepting greater ΔT tolerances in the block 202 tapped delay line.

A sampling clock signal 222 is provided for the jitter measuring circuit 102 to synchronize the operation thereof. The frequency of the sampling clock signal 222 may be the same as that of the data signal under test 220, or as discussed above, may have a different frequency. Regardless of the frequency of the sampling clock signal 222, the total delay through the block 202 tapped delay line is configured to be greater than a cycle period of the sampling clock signal 222.

Each of the ΔT time delays in the delay elements 202x is very small compared to the cycle period of the sampling clock signal 222. Thus, it is possible to accurately resolve the positions of the signal transitions (from 0 to 1 or vice versa) in the data signal under test 220 to within one ΔT time interval.

To determine the position of a signal transition, the jitter measuring circuit 102 looks for the edge of the signal transition, either rising (going from 0 to 1) or falling (going from 1 to 0), since the circuit can measure jitter on rising edges, falling edges, and/or both edges.

Accordingly, as a signal transition enters the block 202 tapped delay line at the delay element 202A, it is delayed by the corresponding $\Delta T$ time delay and then similarly repeatedly delayed as it progresses up the delay chain to the delay element 202N. At the output of each delay element 202$x$, there is a tap 224$x$. These taps (224A, 224B, . . . 224N) each provide respective output signals reflecting the state of the data signal under test 220 at that corresponding position in the block 202 tapped delay line.

As shown in FIG. 2, the taps 224$x$ are connected to the block 204 sample register to report the state of the data signal under test 220 at each of the delay elements 202$x$. Each of the taps 224$x$ is accordingly connected from a respective delay element 202$x$ to a respective flip-flop 204$x$ in a series of flip-flops 204A, 204B, . . . 204N in the block 204 sample register. The flip-flops 204$x$ thus correspond respectively to the delay elements 202$x$.

The sampling clock signal 222 is also provided to the series of flip-flops 204$x$ for the control thereof. Then, on each cycle of the sampling clock signal 222, the flip-flops 204$x$ in the block 204 sample register sample the output from the block 202 tapped delay line on the taps 224$x$. That sampling captures the state of the tap 224$x$ outputs from the block 202 tapped delay line in the respective flip-flops 204$x$ in the block 204 sample register. That output state is latched onto the block 204 sample register until the next cycle of the sampling clock signal 222.

Thus, in operation, as a signal transition propagates through the tapped delay line in the block 202, the state of the signal appearing on progressive taps 224$x$ will change (for example, from 0 to 1 or vice versa). For a transition from 0 to 1, all of the delay elements toward the beginning of the block 202 tapped delay line and up to the position of the transition will have a value of 1. Those beyond the transition (toward the delay element 202N) will not yet have changed and thus will continue to have a value of 0.

When a cycle of the sampling clock signal 222 is then presented to the flip-flops 204$x$ in the block 204 sample register, the transition point will be captured by the block 204 flip-flops since they will latch with the respective 1's and 0's at that instant. Since the total delay of the block 202 tapped delay line is greater than (longer than) the cycle period of the sampling clock signal 222, the transition will be somewhere within the block 202 tapped delay line and will be captured at its location therein as the transition location is then latched by the flip-flops 204$x$ in the block 204 sample register.

In a situation in which there is no jitter on the data signal under test 220, and in which the sampling clock signal 222 has the same frequency as the data signal, the transition points will always appear at the same places in the block 202 tapped delay line. If there is jitter on the data signal, such as from the transmission channel 108, then the jitter will appear as movement of the signal transition edges if the jitter has an amplitude greater than $\Delta T$. Furthermore, if there is not an exact frequency match between the sampling clock signal 222 and the frequency of the data signal under test 220, it will now be clear that the edge of the signal transition will move progressively in accordance with the difference between these frequencies. However, because the difference between the signal under test data bit rate and the sampling clock rate will be known, the jitter measuring circuit 102 readily computes a corresponding offset and returns the correct jitter values and results.

Since the total length of the block 202 tapped delay line, in terms of the time delay generated therein, is more than the cycle period of the sampling clock signal 222, each signal transition that passes through the block 202 tapped delay line will be captured by the block 204 sample register flip-flops. In fact, when the transition appears near the beginning or the end of the block 202 tapped delay line, it is possible that another transition will be captured simultaneously near the opposite end of the block 202 tapped delay line. However, because the circuitry tracks the location where the transition edge should be (as described further herein), there is no confusion about where the bit edge position is actually located.

Referring now to the block 206 priority encoder, all of the data from the flip-flops 204$x$ is received by the block 206 priority encoder. The block 206 priority encoder then reports the count or location of where the signal transition occurred in the block 202 tapped delay line. In one embodiment, this is directly achieved by counting the number of the flip-flops 204$x$ that have a value of 1 and reporting that number, since such a tally reflects just how far the signal edge has propagated. More specifically, if the flip-flop 204A has a value of 1, then a binary count can be made of all of the flip-flops from 204A up to the flip-flop having a value of 0. Conversely, if the flip-flop 204A has a value of 0, a count can be made up to the flip-flop 204$x$ having a value of 1. The result is a single (binary) output number from the block 206 priority encoder that indicates at what tap 224$x$ the transition was located when the sampling clock signal 222 triggered a sample cycle.

The output from the block 206 priority encoder is supplied through a bus 226, which may be a parallel data bus, to the block 208 converter. The output from the block 206 priority encoder on the bus 226 is the delay value, and the block 208 converter combines this delay value with the sampling clock signal 222 to provide a time value output that indicates the time that the signal transition occurred.

Figure 3:
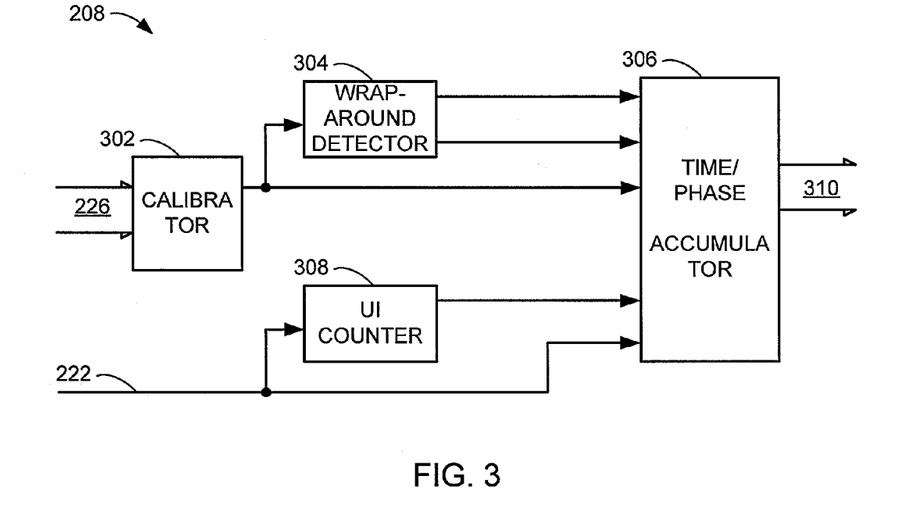
FIG. 3 is a block circuit diagram of the converter for converting the clock and delay to time values of FIG. 2.

Referring now to FIG. 3, therein is shown a more detailed block circuit diagram of the block 208 converter shown in FIG. 2. The block 208 converter includes a block 302 that is a calibrator, a block 304 that is a wrap-around detector, a block 306 that is a time/phase accumulator, and a block 308 that is a UI counter.

The block 302 calibrator calibrates the $\Delta T$ time delay intervals for each of the delay elements 202$x$ (FIG. 2), as described above, so that each of the taps 224$x$ of the block 202 tapped delay line corresponds to an accurate time measurement.

The block 304 wrap-around detector (FIG. 3) detects when the measured transition point from the block 202 tapped delay line (FIG. 2) has moved past the end (either beginning or ending, e.g., the bottom or top) of the block 202 tapped delay line. The block 304 wrap-around detector thus allows the length of the block 202 tapped delay line to be reasonable and not too expensive. The block 304 wrap-around detector accomplishes this by detecting and processing timing variations greater than the length of the block 202 tapped delay line by adding or subtracting one corresponding UI as appropriate, depending on the direction (up or down) of the wrap-around.

The block 306 time/phase accumulator determines the phase (relative to one signal frequency cycle) of the incoming signal transition in relation to where the signal transition would be located in the absence of jitter. The phase determination is made by processing the several inputs and providing the measured phase of the edge position as an edge position output 310.

One of the important functions of the block 208 converter is to accommodate consecutive 0's or 1's in the data signal under test 220. There are no transitions, of course, between consecutive bits (0's or 1's) of the same value. Without a transition, jitter cannot be measured. The block 308 UI counter counts the number of bits received from the sampling clock signal 222 and reports this count to the block 306 time/phase accumulator. With this information, the block 208 converter keeps count of the sampling clock cycles until another data signal transition actually comes along. The block 208 converter then predicts the expected edge position of the transition based on the number of corresponding data signal cycles that have passed. The block 208 converter then interpolates what the edge position shift is, if any, relative to the predicted edge position. Since the block 208 converter knows the sampling clock signal 222 frequency relative to the frequency of the data signal under test 220 (FIG. 2), it simply counts the required number of bits from the sampling clock signal 222 for each cycle of the data signal under test 220. For this reason, as discussed earlier, it is not necessary for the frequency of the sampling clock signal 222 to be the same as that of the data signal under test 220.

Advantageously, the block 302 calibrator (FIG. 3) can be recalibrated when desired, as may be appropriate, for example, in response to temperature and/or voltage variations. For such calibration, the data signal under test 220 (FIG. 2) is replaced by a known signal that causes the transition point on the block 202 tapped delay line to propagate through the block 202 tapped delay line at a known rate. The actual values that are then reported on the bus 226 are recorded in the block 302 calibrator so that the actual individual $\Delta T$ time delays of the corresponding delay elements 202x (FIG. 2) are accordingly correlated in the block 302 calibrator.

The block 210 over-range detector (FIG. 2) analyzes and detects when the edge position output 310 that is reported by the block 208 converter has moved in excess of a set magnitude or fraction of a UI. For example, when an edge transition is detected, its edge position is reported by the block 208 converter as the edge position output 310. However, if a sequence of 0's or 1's occurs, the block 208 converter output will not change because there is no data edge in such an unchanging sequence. Therefore, the block 208 converter cannot update the edge position location. Eventually the data sequence will change and an edge will be detected. By then, however, the jitter error may have accumulated sufficiently that the block 208 converter will report a significant fraction of a UI (for example, close to 0.5 UI). In such a case, it cannot be confidently determined exactly which interval (preceding, current, or succeeding) the detected transition came from, meaning that the data analysis may have become unreliable. The block 210 over-range detector therefore contains a user definable threshold for warning when such an over-range event has occurred.

The block 212 DSP filters enable the jitter amplitude to be measured in particular bandwidths. The block 212 DSP filters may be selected, for example, according to the need to meet particular specifications, thereby providing for proper measurements of amplitudes in respective bandwidths. The block 212 DSP filters are also configured to filter away high frequency noise and low frequency "wander".

The outputs from the block 212 DSP filters are provided through an output 228 (for example, a data bus) to the block 214 peak-to-peak detector. The block 214 peak-to-peak detector measures the peak-to-peak values of the jitter, typically in terms of peak-to-peak UI's. For example, if a timing uncertainty moves back-and-forth by one UI, then this will constitute one UI peak-to-peak. The block 214 peak-to-peak detector thus measures how far the data transition edge jitters in one direction and how far it jitters in the other, subtracts the two, and outputs the result as a peak-to-peak UI height. This measurement may be repeated at set intervals, for example one second, and displayed to provide a dynamic output display of the peak-to-peak jitter behavior of the data signal under test 220.

The outputs from the block 212 DSP filters are also provided through the output 228 to the block 216 RMS calculator. The block 216 RMS calculator analyzes the edge position output 310 to calculate and measure the RMS of the jitter signal by taking the position of the transition edge of the jitter signal, measuring the RMS value of that edge position during a set measurement interval (e.g., one second), and outputting the resultant RMS value thereof. This RMS measurement can be repeated over set measurement intervals (e.g., once per second) to provide a dynamic output display of the RMS jitter behavior of the data signal under test 220.

The peak-to-peak and the RMS values are very useful for debugging telecommunications systems. For example, the peak-to-peak value represents the amplitude of the jitter, and the RMS value quantifies a value analogous to jitter "power".

The block 218 dither unit adds accuracy and resolution to the jitter measurement by deliberately adding additional jitter (e.g., timing noise) onto the data signal under test 220 prior to injecting it into the measurement circuitry. By adding a timing uncertainty of several $\Delta T$ time delay periods, for example, jitter values on the data signal under test 220 can be resolved to less than one $\Delta T$ value. This can be illustrated, for example, by considering a jitter present on the data signal under test 220 having a value less than one $\Delta T$. In that case, many of the edge transition movements from one cycle of the sampling clock signal 222 to the next will occur within the anticipated or predicted delay element 202x for that sampling clock signal 222 cycle. Thus, even though jitter is actually present, it will not change the "jitter-free" output that is expected when latched by the flip-flops 204x. Since the transition edge thus appears each time in the delay element 202x where it is expected, the jitter on the transition edge is masked and not detected. The same would be true for larger jitter values having a unit and a similarly small decimal $\Delta T$ value, particularly where the jitter value is fairly stable over several measurement cycles.

However, by using the block 218 dither unit to introduce dither into the data signal under test 220, additional timing uncertainty is added onto the data signal. The additional timing uncertainty caused by the additional dither timing noise forces the transition edge to move back and forth in larger excursions. This additional dither timing noise, which is preferably at a high frequency relative to the jitter frequency, is now detected, combined with the data signal under test 220. Due to the increased signal excursion, the combined signal (dither plus data) is detected cyclically by several of the flip-flops 204x. The alternate detections are then averaged, resulting in a more accurate determination of the actual jitter.

The high-frequency timing noise from the block 218 dither unit itself is then filtered out by the DSP filters in the block 212, so the dither signal never appears as part of the data output from the jitter measuring circuit 102. Further, by selecting high-frequency noise for the block 218 dither unit input, it is then not necessary to change or adapt the block 212 DSP filters because the high frequency of the dither will be outside the band(s) of interest that are passed by the DSP filters. Thus the block 212 DSP filters will already be configured to discard such high-frequency noise.

The block 218 dither unit can be implemented in a number of different ways. For example, a noisy power supply can be used for the jitter measuring circuit 102. Such a power supply will typically be less expensive, thereby reducing the cost of the jitter measuring circuit 102 while unexpectedly increasing the accuracy thereof. Alternatively or in addition, available integrated circuits can be put in series with the incoming data signal under test 220 to add programmable delay, and thus provide for affirmatively tuning the resolution of the jitter measuring circuit 102 as needed.

As can be seen, the present invention can be implemented without analog circuitry. Therefore, significant savings can be realized in terms of cost, size, energy consumption, and so forth, because the entire jitter measuring circuit 102 can be implemented in a single FPGA. This is possible, in part, due to the discovery that the block 202 tapped delay line can be implemented in an FPGA by using the FPGA carry chain as a functional tapped delay line for the jitter measuring circuit 102. (The FPGA carry chain is ordinarily used as an arithmetic logic accelerator.) In particular, the carry chain cascaded multiplexers are configured in series to form the block 202 tapped delay line. The time delays that are then provided by the carry chain cascaded multiplexers are utilized to unexpectedly make possible the implementation of the entire jitter measuring circuit 102 in a single FPGA.

Figure 4:
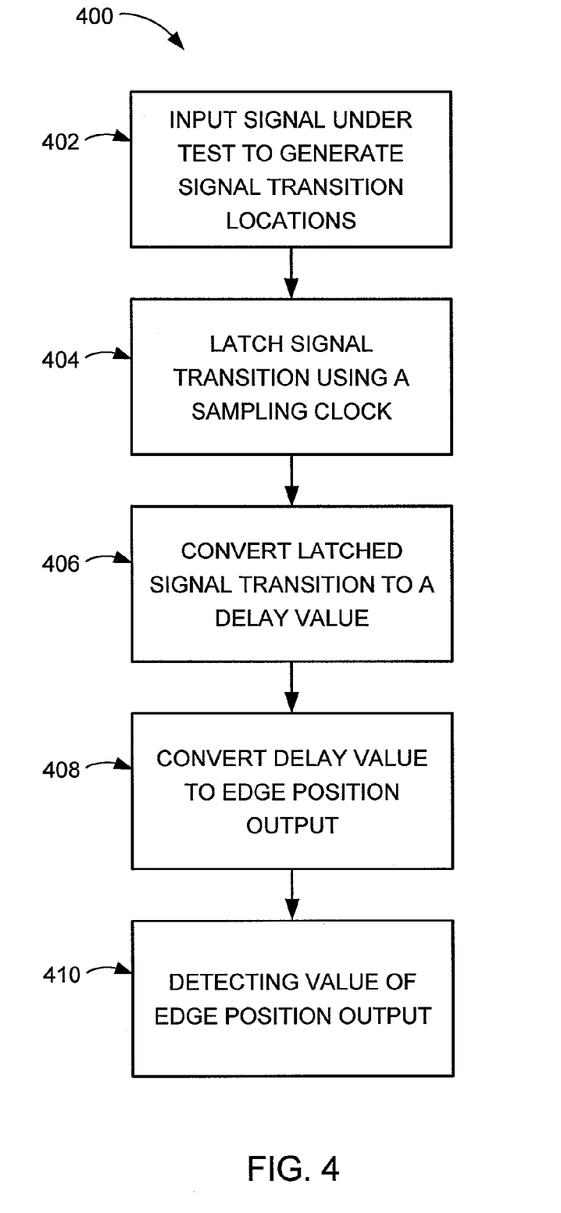
FIG. 4 is a flow chart of a method for measuring jitter in accordance with the present invention.

Referring now to FIG. 4, therein is shown a flow chart of a method 400 for measuring jitter in accordance with the present invention. The method 400 includes inputting a signal under test to generate signal transition locations in a block 402; latching a signal transition location using a sampling clock signal in a block 404; converting the signal transition location to a delay value in a block 406; converting the delay value to an edge position output in a block 408; and detecting a value of the edge position output in a block 410.

It has been discovered that the present invention has numerous advantages. For example, the jitter measuring circuit 102 can also be utilized for measuring wander. This can be achieved by using a sampling clock signal 222 that has stability over long periods of time, such as might be available, for example, from an atomic clock source. Corresponding adjustments to the block 212 DSP filters would then be made to detect and pass signals in that bandwidth.

The outputs from the block 214 peak-to-peak detector and/or the block 216 RMS calculator can be displayed, for example, on an oscilloscope, to provide a visual form of jitter display.

In another embodiment, the output signals from the block 212 DSP filters can be put through a fast Fourier transform ("FFT") to yield a spectrum signal for the jitter. Such a signal can then be processed by a spectrum analyzer to reveal the frequencies at which the jitter is present. Such results can significantly assist in diagnosing jitter sources. For example, in one implementation, a 390 kHz jitter was quickly isolated and then traced to an FPGA switching power supply that was switching at the same 390 kHz frequency. The switching power supply was readily identified by the spectral fingerprint supplied by the FFT.

In addition to real-time diagnostics, the present invention can additionally be utilized with recording equipment to provide later playback and analysis of the jitter signals. This not only facilitates more careful evaluation of the jitter, but also enables comparisons and trend analyses over time of measurements made at different times on various systems. It could also be used for equipment failure analysis by recording during the failure and then replaying to analyze the causes of the failure.

The present invention also enables automatic compensation by using the results of the jitter analysis to feed back into a signal compensator, thereby serving as a dynamic jitter attenuator.

The present invention can also measure phase "hits", that is, sudden changes in the phase of the data signal. One example of a phase hit can occur in a multiplexing situation upon activation of an additional piece of equipment, such as adding several additional T1s into a multiplexed signal. The phase of the signal sometimes shifts suddenly when that happens.

Based on the above teachings, the present invention can also be used to measure how much noise there is in the power supply of an FPGA. With present FPGAs running at faster and faster rates, this is becoming a greater concern. Since the present invention can be implemented on a single FPGA, the invention can be loaded into the target FPGA and used as described above to measure the quality of the FPGA power supply.

In still another embodiment, the present invention can be used to give very accurate time measurements in an environment where noisy measurements can be made at a high rate relative to the required output. The block 212 DSP filters are then calibrated to filter out the high-frequency noise, yielding an accurate time measurement, somewhat similarly to the processing and removal of the noise that was added by the block 218 dither unit.

Thus, it has been discovered that the jitter measuring method and apparatus of the present invention furnish important and heretofore unknown and unavailable solutions, capabilities, and functional advantages for diagnosing jitter in data transmission signals. The resulting process and configurations are straightforward, economical, uncomplicated, highly versatile, accurate, sensitive, and effective, and can be implemented by adapting known components for ready manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

The invention claimed is:

1. A method for measuring jitter on a data signal, comprising:

inputting a data signal under test to digitally generate at least one data signal transition location in delay elements of a delay line;

determining $\Delta T$ time delays of the delay elements without using the data signal under test;

digitally latching the data signal transition location using a stable sampling clock signal and only the output of the delay line;

digitally converting the latched data signal transition location to a delay time value output that is the $\Delta T$ time delays of the corresponding delay elements;

digitally converting the delay time value to an edge position output; and digitally detecting a value of the edge position output.

2. The method of claim 1 further comprising filtering the edge position output prior to detecting a value of the edge position output.

3. The method of claim 1 further comprising adding a dither signal to the signal under test prior to inputting the signal under test to generate signal transition locations.

4. The method of claim 1 further comprising analyzing the edge position output to determine edge position movement in excess of a predetermined magnitude.

5. The method of claim 1 further comprising analyzing the edge position output to provide a root mean square value thereof.

6. A method for measuring jitter on a data signal, comprising:

inputting a data signal under test to digitally generate at least one data signal transition location in elements of a delay line;

determining ΔT time delays of the delay elements without using the data signal under test;

digitally latching the data signal transition location using a stable sampling clock signal and only the output of the delay line;

digitally converting the latched data signal transition location to a delay time value output that is the ΔT time delays of the corresponding delay elements;

digitally converting the delay time value to an edge position output using the sampling clock signal;

digitally detecting peak-to-peak values of the edge positions; and outputting the detected peak-to-peak values of the edge positions.

7. The method of claim 6 further comprising filtering the edge position outputs prior to detecting peak-to-peak values of the edge position outputs.

8. The method of claim 6 further comprising adding a dither signal to the data signal under test prior to inputting the data signal under test.

9. The method of claim 6 further comprising analyzing the edge position output to determine edge position movement in excess of a predetermined unit interval magnitude.

10. The method of claim 6 further comprising analyzing the edge position output to provide a root mean square value thereof.

11. Apparatus for measuring jitter on a data signal, comprising:

a tapped delay line having delay elements for digitally generating at least one data signal transition location therein from a data signal under test inputted thereinto;

circuitry including a calibrator for determining the ΔT time delays of the delay elements without using a data signal under test;

a stable sampling clock signal;

a sample register connected for digitally latching the data signal transition location therein in response to the stable sampling clock signal and only the output of the delay line;

a priority encoder connected for digitally converting the latched data signal transition location to a delay time value output that is the ΔT time delays of the corresponding delay elements;

a converter connected for digitally converting the delay time value output to an edge position output; and a peak-to-peak detector connected for digitally detecting values of the edge positions.

12. The apparatus of claim 11 further comprising a digital signal processing filter connected for filtering the edge position output prior to the peak-to-peak detector detecting values of the edge positions.

13. The apparatus of claim 11 further comprising a dither unit connected for adding a dither signal to a signal under test prior to the signal under test being inputted into the tapped delay line.

14. The apparatus of claim 11 further comprising an over-range detector connected for analyzing the edge position output to report edge position movement in excess of a predetermined magnitude.

15. The apparatus of claim 11 further comprising a block that:

performs root mean square measurement calculations; and is connected for analyzing the edge position output to provide a root mean square value thereof.

16. Apparatus for measuring jitter on a data signal, comprising:

a field programmable gate array carry chain;

a tapped delay line having delay elements, that is implemented in the field programmable gate array carry chain for digitally generating at least one data signal transition location therein from a data signal under test inputted thereinto;

circuitry including a calibrator for determining the ΔT time delays of the delay elements without using a data signal under test;

a stable sampling clock signal;

a sample register connected for digitally latching the data signal transition location therein in response to the stable sampling clock signal and only the output of the delay line;

a priority encoder connected for digitally converting the latched data signal transition location to a delay time value output that is the ΔT time delays of the corresponding delay elements;

a converter for digitally converting clock and delay time value output to time values and connected for digitally converting the delay time value output to an edge position output; and a peak-to-peak detector connected for digitally detecting and outputting peak-to-peak values of the edge positions.

17. The apparatus of claim 16 further comprising digital signal processing filters connected for filtering the edge position output prior to the peak-to-peak detector detecting peak-to-peak values of the edge positions.

18. The apparatus of claim 16 further comprising a dither unit connected for adding a dither signal to a data signal under test prior to the data signal under test being inputted into the tapped delay line.

19. The apparatus of claim 16 further comprising an over-range detector connected for analyzing the edge position output to report edge position movement in excess of a predetermined unit interval magnitude.

20. The apparatus of claim 16 further comprising a block that:

performs root mean square measurement calculations; and is connected for analyzing the edge position output to provide a root mean square value thereof.

* * * * *